US010108736B2

(12) United States Patent
Liu

(10) Patent No.: US 10,108,736 B2
(45) Date of Patent: Oct. 23, 2018

(54) METHOD AND APPARATUS FOR RENDERING STATISTICS ON WEB PAGE VISITS BY A BROWSER

(71) Applicant: Tencent Technology (Shenzhen) Co., Ltd., Shenzhen, Guangdong (CN)

(72) Inventor: Jing Liu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 408 days.

(21) Appl. No.: 14/871,209

(22) Filed: Sep. 30, 2015

(65) Prior Publication Data

US 2016/0019310 A1    Jan. 21, 2016

Related U.S. Application Data

(63) Continuation of application No. PCT/CN2014/080709, filed on Jun. 25, 2014.

(30) Foreign Application Priority Data

Jun. 27, 2013 (CN) .......................... 2013 1 0263547

(51) Int. Cl.
    *G06F 17/30* (2006.01)
(52) U.S. Cl.
    CPC .............. *G06F 17/30899* (2013.01)
(58) Field of Classification Search
    CPC .................................................. G06F 17/3089
    See application file for complete search history.

(56) References Cited

U.S. PATENT DOCUMENTS 5,960,429 A * 9/1999 Peercy .............. G06F 17/30864
                                                     707/752
7,783,632 B2 * 8/2010 Richardson ....... G06F 17/30864
                                                     707/727
(Continued)

FOREIGN PATENT DOCUMENTS

CN        101193008 A        6/2008
CN        101373485 A        2/2009
(Continued)

OTHER PUBLICATIONS

International Preliminary Report on Patentability and Written Opinion received in PCT Application No. PCT/CN2014/080709 dated Dec. 29, 2015.
(Continued)

*Primary Examiner* — Asher D Kells
(74) *Attorney, Agent, or Firm* — Brinks Gilson & Lione

(57) ABSTRACT

A method and apparatus for rendering statistics on web page visits by a browser are disclosed. The method including: adding a respective first and second counts to a respective first and second cumulative number of visits to a first web page upon detecting that a browser has visited the first web page via a respective first and second visiting modes. The second visiting mode including redirecting to the first web page through selecting a web page link of a pending web page in the browser; acquiring the first and the second cumulative number of visits for each web page, and combining a first and a second preset weight of the first and the second visiting modes to calculate a visit coefficient for the web page; and determining a most frequent visited web page from among all the web pages based on a web page with the highest calculated visit coefficient.

9 Claims, 2 Drawing Sheets

(56) References Cited

U.S. PATENT DOCUMENTS

| | | | |
|---|---|---|---|
| 8,600,968 B2* | 12/2013 | Holenstein | G06F 17/30876 707/706 |
| 2004/0261026 A1* | 12/2004 | Corson | G06F 9/45512 715/704 |
| 2005/0132296 A1* | 6/2005 | Milic-Frayling | G06F 17/30873 715/745 |
| 2007/0088820 A1* | 4/2007 | Kwak | G06F 17/30884 709/224 |
| 2009/0171930 A1* | 7/2009 | Vaughan | G06F 17/30876 |
| 2012/0271805 A1* | 10/2012 | Holenstein | G06F 17/30876 707/706 |
| 2014/0229601 A1* | 8/2014 | Zhao | G06F 17/30887 709/223 |
| 2014/0359424 A1* | 12/2014 | Lin | G06F 17/30876 715/234 |
| 2015/0347358 A1* | 12/2015 | Shultz | G06F 3/04817 715/234 |

FOREIGN PATENT DOCUMENTS

| | | |
|---|---|---|
| CN | 102314455 A | 1/2012 |
| CN | 102651021 A | 8/2012 |
| CN | 102880682 A | 1/2013 |
| JP | 2007-004564 A | 1/2007 |
| WO | WO2009/035103 A1 | 3/2009 |

OTHER PUBLICATIONS

International Search Report received in PCT Application No. PCT/CN2014/080709 dated Aug. 18, 2014.

* cited by examiner

METHOD AND APPARATUS FOR RENDERING STATISTICS ON WEB PAGE VISITS BY A BROWSER

CROSS-REFERENCE TO RELATED APPLICATIONS

The application is a continuation of PCT Application No. PCT/CN2014/080709, filed on Jun. 25, 2014, which claims priority to Chinese Patent Application No. 2013102635476, filed on Jun. 27, 2013, which are incorporated by reference in their entireties.

FIELD OF THE TECHNOLOGY

The invention belongs to the field of network technology; in particular, it involves a method and an apparatus for rendering statistics on web page visits by a browser.

BACKGROUND

In order to optimize a user's web experience so as to provide faster and more convenient services to browse web pages, most browsers have a function of keeping statistics on "most frequently visited web pages" (such as to popular news website, social network website, email service provider or on-line shopping website, etc.) which may record how often a user may visit the web pages from a browser. The browser may keep statistics on the several individual web pages which are linked to the most frequent visited web pages. As a result, the statistics may provide convenience in guiding the user to launch directly to the most frequently visited web page, and intuitively direct the user to the corresponding links on the most frequently visited web pages without further searches.

The existing method of calculating the statistics of the "most frequently visited web pages", however, are limited only to the newly opened tab page in the browser. For example, a new tab page in the browser may be opened by inputting one of: a web address, web page navigation, a web page bookmark or a web page history, etc. in order to visit the web page. The actual process of visiting the web page under the same tab page is considered in the statistics calculation. However, the redirecting through a link (i.e., clicking on the link) of the current web page to another web page may not be included in the statistics calculation under the existing statistical method. Consequently, the results calculated under the existing method may not accurately reflect a comprehensive statistical analysis of the most frequently visited web page.

SUMMARY

An embodiment of the disclosure discloses a method of rendering statistics on web page visits by a browser. The method including: adding a count to a first cumulative number of visits to a first web page upon detecting that a browser has visited the first web page via a first visiting mode; adding a count to a second cumulative number of visits to the first web page upon detecting that the browser has visited the first web page via a second visiting mode, wherein the second visiting mode comprising redirecting to the first web page through user's clicking on a web page link of a pending web page which has already been loaded into the browser, acquiring the first cumulative number of visits and the second cumulative number of visits for each web page which the browser has visited, and combining a preset weight of the first visiting mode and a preset weight of the second visiting mode in order to calculate a visit coefficient for each of the web page the browser has visited; and determining a most frequent visited web page among all the web pages visited by the browser based on a preset individual web page having the highest calculated visit coefficient.

In another embodiment, the disclosure discloses an apparatus for rendering statistics on web page visits by a browser. The apparatus may include: at least a processor operating in conjunction with at least a memory which stores instruction codes operable as plurality of units, wherein the plurality of units may include: a first counting unit which adds a count to a first cumulative number of visits to a first web page upon detecting that a browser has visited the first web page via a first visiting mode; a second counting unit which adds a count to a second cumulative number of visits to the first web page upon detecting that the browser has visited the first web page via a second visiting mode, wherein the second visiting mode comprising redirecting to the first web page through user's clicking on a web page link of a pending web page which has already been loaded into the browser, a calculating unit which acquires the first cumulative number of visits and the second cumulative number of visits for each web page which the browser has visited, and combining a preset weight of the first visiting mode and a preset weight of the second visiting mode in order to calculate a visit coefficient for each of the web page the browser has visited; and a determining unit which determines a most frequent visited web page among all the web pages visited by the browser based on a preset individual web page having the highest calculated visit coefficient.

Yet another embodiment of the disclosure discloses a non-transitory computer-readable medium having stored thereon, a computer program having at least one code section being executable by a mobile terminal which causes the mobile terminal to perform steps for rendering statistics on web page visits by a browser, the steps including: adding a count to a first cumulative number of visits to a first web page upon detecting that a browser has visited the first web page via a first visiting mode; adding a count to a second cumulative number of visits to the first web page upon detecting that the browser has visited the first web page via a second visiting mode, wherein the second visiting mode comprising redirecting to the first web page through user's clicking on a web page link of a pending web page which has already been loaded into the browser, acquiring the first cumulative number of visits and the second cumulative number of visits for each web page which the browser has visited, and combining a preset weight of the first visiting mode and a preset weight of the second visiting mode in order to calculate a visit coefficient for each of the web page the browser has visited; and determining a most frequent visited web page among all the web pages visited by the browser based on a preset individual web page having the highest calculated visit coefficient.

In the process of compiling statistics of the web pages which the browser most frequently visits, the embodiments of the present disclosure provides a statistical range which includes the situation of visiting the web page by redirecting to the web page through a link from another web page already loaded into the browser. Accordingly, the determination of a most frequently visited web page calculated statistics at least reflects the contribution from the redirected web page due to visits caused by linking from another web page of a different domain. The disclosed method therefore provides a more comprehensive and accurate statistical account.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, only the newly added features or features that are different from those previously described in each new embodiment will be described in details. Similar features may be referenced back to the prior descriptions in a prior numbered drawing or referenced ahead to a higher numbered drawing.

In order to clarify the object, technical scheme and advantages of the present disclosure more specifically, the present disclosure is illustrated in further details with the accompanied drawings and embodiments. It should be understood that the embodiments described herein are merely examples to illustrate the present disclosure, not to limit the present disclosure.

In the process of compiling statistics of the web pages which the browser frequently visits, the embodiments of the present disclosure provides a statistical range covering the scenario of visiting respective second web pages as a result of redirecting the first web page through clicking the respective links of the first web page on the browser. The provided statistics therefore reflect a more comprehensive and accurate indication of which of the webpages being the most frequently visited by the user, thus providing faster web page launching operations without performing additional operations.

Figure 1:
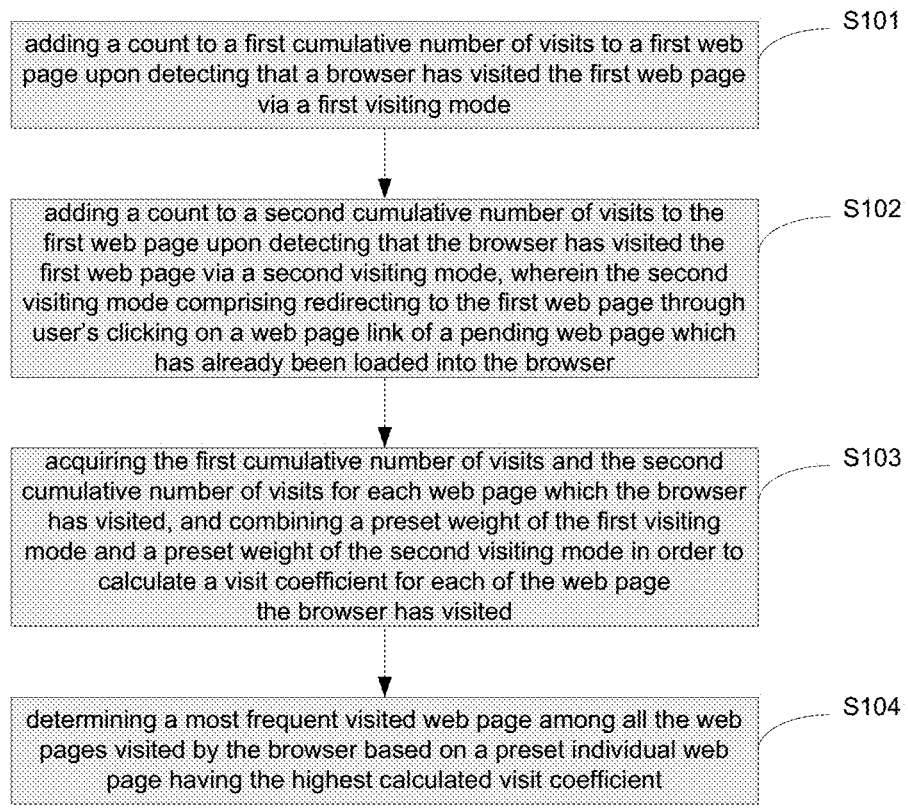
FIG. 1 illustrates an exemplary flow diagram of a method of rendering statistics on web page visits by a browser, according to an embodiment of the disclosure.
Figure 3:
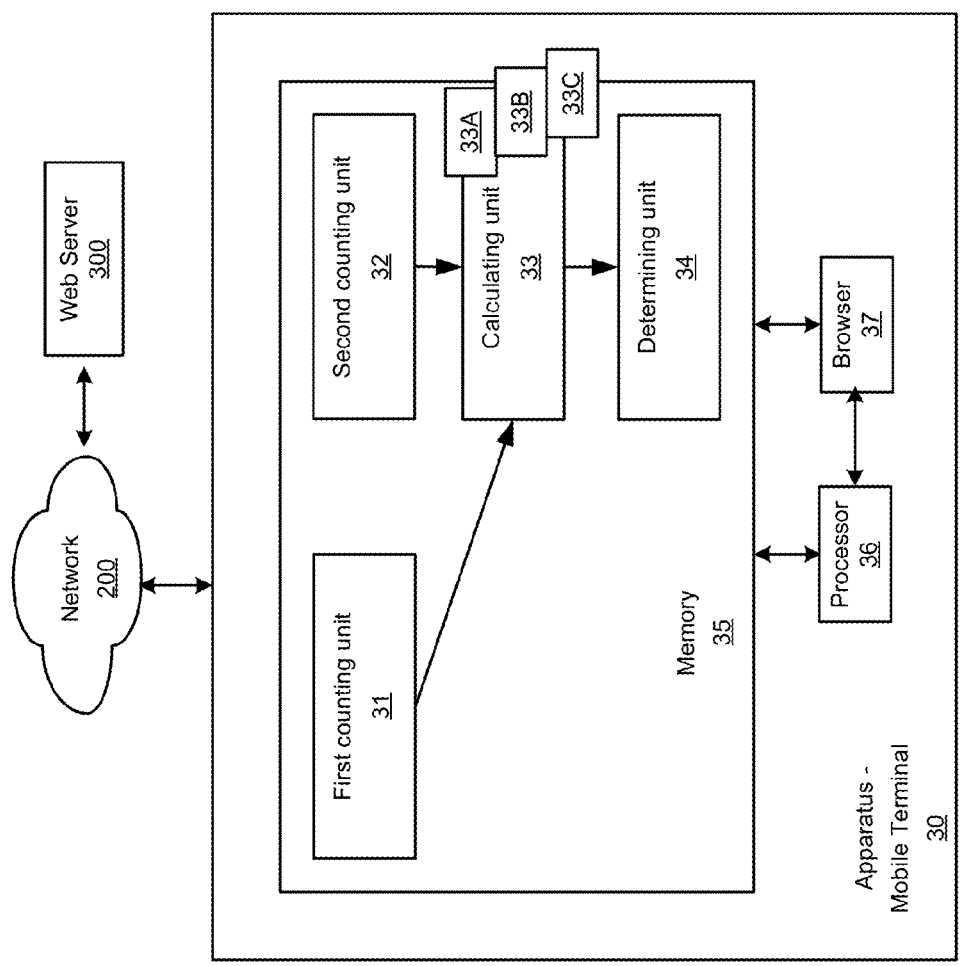
FIG. 3 depicts an exemplary structural block diagram of an apparatus, which renders statistics on web page visits by a browser, according to an embodiment of the disclosure.

FIG. 1 illustrates an exemplary flow diagram of a method of rendering statistics on web page visits by a browser, according to an embodiment of the disclosure. The method may include at least the following steps:

In step S101: adding a count to a first cumulative number of visits (i.e., via the first counting unit (31) in FIG. 3) to a first web page upon detecting that a browser (e.g., browser (37) in FIG. 3) has visited the first web page via a first visiting mode. The first visiting mode may include any one of the following: an address bar input, a browser navigation bar, a browser bookmark, or a browser history log.

More specifically, the address bar input may be an input of the Uniform Resource Locator (URL) into an address bar of a newly opened window or a tab page in the browser, so that a web page corresponding to this URL may be loaded (i.e., from a web server (300) through the network (200)). Alternately, the address bar input may be an input with a keyword in English or Chinese characters, such that a search result page pertaining to the English or Chinese characters may be loaded as a newly opened window or a tab page in the browser, wherein the English or Chinese characters keyword may be acquired by a default search engine of the browser.

The browser navigation bar may be a designated area at the interface of the browser, and a plurality of web page links (to respective second web pages) that may have been preset on the client side of the browser may be classified and shown in this designated area. For example, the web page links may be hot news websites and video websites on the Internet. The visits to corresponding web pages (i.e., second web pages via the respective web page links) may be quickly realized by clicking on these respective web page links. Alternately, a preset starting page or navigation page of the browser may also classify and show the plurality of web page links preset by the client side of the browser.

The bookmark shown in a bookmark bar in the browser (37) may be a web page link which may be added by a user in the browser for user's convenience when visiting the same type of web pages in the future.

The history log may be a record of the web pages previously browsed by a user in the browser (37).

In the present embodiment, the first cumulative number of visits to anyone web page is initially zero by default. When the browser (37) has been detected to visit the web page through any first visiting mode, then a count of one ("1") may be added to the first cumulative number of visits (e.g., accumulated and stored in a register) to this web page.

In step S102: adding a count to a second cumulative number of visits (i.e., via the second counting unit (32) in FIG. 3) to the first web page upon detecting that the browser has visited the first web page via a second visiting mode, wherein the second visiting mode include redirecting to the first web page through user's clicking on a web page link of a pending web page which has already been loaded into the browser.

More specifically, the second visiting mode being different from the first visiting mode by the fact that the first web page's visit is through a redirecting from another pending web page (of a different domain), where the redirecting triggered through user's clicking on a respective web page link in the web page which has already been loaded into the browser window or redirected through a tab page of the browser in which the pending web page has been previously loaded.

As mentioned in the above embodiment, the pending web page which redirects the link to visit the first web page as the second visiting mode is a web page loaded from a different domain name. In addition, the second visiting mode may be considered to have a relatively low rate of repeated visits by the browser, and therefore may be considered as web pages corresponding to a second-level domain, or a third-level domain, etc.

The second-level domain or a third-level domain web page may still correspond to being under a website with a same domain name of the pending web page already loaded into the browser. Accordingly, the probability that any of such second-level domain or a third-level domain web pages becoming the "most frequently visited web page" of the browser may be relatively small. Therefore, if the statistics of all the situations as a result of redirecting the web pages under the same domain name are made, then the amount of insignificant or less useful statistical information may become excessive, thus reduces statistical calculation efficiency of the browser.

In a first example, a browser may have already loaded a home page of a news website A in its tab page. Upon the browser detecting an event whereby a user may have clicked on a news link in the home page of the news website A, the web page in this tab page will be redirected from the home page of the news website A to another web page which corresponding to the news link. Under the present embodiment of second visiting mode, since the web page corresponding to the news link and the home page of the news website A both share a same domain name, the second cumulative number of visits to the web page corresponding to the news link will not be added with a count.

In a second example, on the other hand, if a user is accustomed to searching for a keyword in the browser through a search website in order to access a frequent visited or favorite website, the tab page of the browser may redirect from the search website to a home page of another website having a different domain name. Under the same embodiment of second visiting mode, the second cumulative number of visits corresponding to the home page having another web page (i.e., under a different domain name), however, will be added with a count instead.

As seen, the above two examples illustrate that even with the same second visiting mode (i.e., visiting a redirected website), two different count results may be yielded depending on whether the redirected website share a same domain name with the home page (or the parent web page) after the redirecting has taken place. In other words, in an actual web page visiting process, the probability that the browser may repeatedly visit a specific web page may be actually quite small. However, the probability that a user may repeatedly access from the browser the same website through a search engine is actually quite high.

Therefore, it may be possible to differentiate between the two respective second visiting modes to yield two respective different counting results, depending on how the redirected web page is linked. Accordingly, the disclosed method provides an efficient and a more accurate statistical cumulative numbers of visits counting result.

In step S103: acquiring the first cumulative number of visits and the second cumulative number of visits for each web page which the browser has visited, and combining a preset weight of the first visiting mode and a preset weight of the second visiting mode in order to calculate a visit coefficient for each of the web page the browser has visited.

In the present embodiment, both the preset weight of the first visiting mode and the preset weight of the second visiting mode may have been pre-stored in the browser. A current visit coefficient of each web page may be calculated according to the abovementioned two types of preset weights as well as both the current first cumulative number of visits and the current second cumulative number of visits to each web page. The visit coefficient may indicate how frequent or often each of the web pages may have been visited by the browser.

In an embodiment of the present disclosure, the preset weight of the first visiting mode may be larger than the preset weight of the second visiting mode.

For example, the preset weight of the first visiting mode may be set to 5, and the preset weight of the second visiting mode may be set to 1. Therefore, the web page which is visited through the second visiting mode may require more often visits (i.e., five times more often) in order to have the same visit coefficient as the web page which is visited through the first visiting mode. In this regard, the web pages which are visited through the second visiting mode are more likely the web pages of a second-level web page, or even a third-level web page, etc. of a website (which are at a lower layer of a web site tree structure). In this regard, the probability that any of such second-level or third-level web pages becoming the "most frequently visited web page" of the browser may be relatively small. Consequently, an excessively large amount of less significant or less useful statistical information may be avoided through the use of preset weights on the respective visiting mode, thus improving the statistical computation efficiency of the browser.

Figure 2:
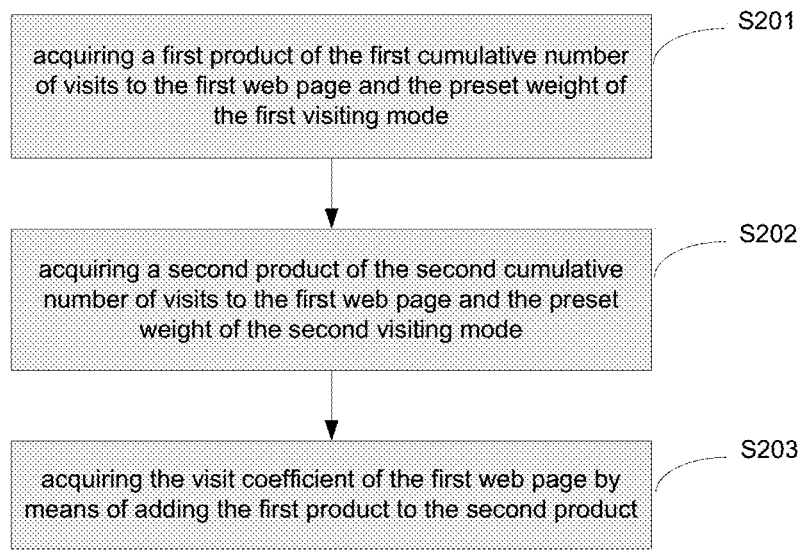
FIG. 2 illustrates an exemplary flow diagram of a method of rendering statistics on web page visits by a browser, according to another embodiment of the disclosure.

FIG. 2 illustrates an exemplary flow diagram of a method of rendering statistics on web page visits by a browser, according to another embodiment of the disclosure. More specifically, FIG. 2 discloses step S103 in more details. Step S103 may further include the following exemplary steps:

In step S201: acquiring a first product of the first cumulative number of visits to the first web page and the preset weight of the first visiting mode.

In step S202: acquiring a second product of the second cumulative number of visits to the first web page and the preset weight of the second visiting mode.

In step S203: acquiring the visit coefficient of the first web page by adding the first product to the second product.

That is to say, the visit coefficient of a web page which has been visited by the browser may be determined according to the following formula:

visit coefficient=first cumulative number of visits×
preset weight of the first visiting mode+second
cumulative number of visits×preset weight of
the second visiting mode.

It should be pointed out that the illustrated calculation of the visit coefficient is only exemplary, which may include, but not limited to the abovementioned formula. In actual calculation, it may be also feasible to use a method which the first product and the second product may be averaged. Alternately, the first product and the second product may be further weighted and summed again to calculate the visit coefficient. The methods may take on different variation according to statistical practice.

In step S104: determining a most frequent visited web page among all the web pages visited by the browser based on a preset individual web page having the highest calculated visit coefficient The visit coefficient of each respective web page which has been visited by the browser may be acquired through the calculation step in S103. The higher the visit coefficient of the web page is, the more frequent the web page has been visited according to the history log from the browser. Accordingly, the preset individual web page having the highest calculated visit coefficient may be determined to be the most frequent visited web page among all the web pages visited by this browser.

FIG. 3 depicts an exemplary structural block diagram of an apparatus (30), which renders statistics on web page visits by a browser (37), according to an embodiment of the disclosure. In an embodiment, the apparatus (30) may be a mobile terminal located on the client side of the browser which executes the method which has been described in FIG. 1 and FIG. 2. For the ease of illustration, only the portion related to the present embodiment is shown.

More specifically, the apparatus (30) may include at least a processor (36) operating in conjunction with at least a memory (37) which stores instruction codes operable as plurality of units, wherein the plurality of units may include:

a first counting unit (31) which adds a count to a first cumulative number of visits to a first web page upon detecting that a browser (37) has visited the first web page via a first visiting mode;

a second counting unit (32) which adds a count to a second cumulative number of visits to the first web page upon detecting that the browser has visited the first web page via a second visiting mode, wherein the second visiting mode including redirecting to the first web page through user's clicking on a web page link of a pending web page which has already been loaded into the browser (37), a calculating unit (33) which acquires the first cumulative number of visits and the second cumulative number of visits for each web page which the browser (37) has visited, and combining a preset weight of the first visiting mode and a preset weight of the second visiting mode in order to calculate a visit coefficient for each of the web page the browser has visited; and a determining unit (34) which determines a most frequent visited web page among all the web pages visited by the browser (37) based on a preset individual web page having the highest calculated visit coefficient.

Optionally, the first visiting mode may include any one of the following: an address bar input, a browser navigation bar, a browser bookmark, or a browser history log.

Optionally, that the second visiting mode may include: redirecting to the first web page from other visiting web pages among different domain names by means of clicking on a respective link of a respective visiting web page which has been loaded.

Optionally, the preset weight of the first visiting mode is larger than the preset weight of the second visiting mode.

Optionally, the calculating unit (33) may further include:

a first acquiring subunit (33A) which acquires a first product of the first cumulative number of visits to the first web page, which the browser has visited, and the preset weight of the first visiting mode;

a second acquiring subunit (33B) which acquires a second product of the second cumulative number of visits to the first web page and the preset weight of the second visiting mode;

a third acquiring subunit (33C) which acquires the visit coefficient of the first web page by means of adding the first product to the second product.

In the process of compiling statistics of the web pages which the browser frequently visits, the embodiments of the present disclosure provides a statistical range covering the scenario of visiting respective second web pages as a result of redirecting the first web page through clicking the respective links of the first web page on the browser. The provided statistics therefore reflect a more comprehensive and accurate indication of which of the webpages being the most frequently visited by the user, thus providing faster web page launching operations without performing additional operations.

It should be understood by those with ordinary skill in the art that all or some of the steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive. ROM or flash memory. The computer-executable commands are used to enable a computer, server, a smart phone, a tablet or any similar computing device to render statistical calculations of web page visits by a browser.

The foregoing represents only some preferred embodiments of the present disclosure and their disclosure cannot be construed to limit the present disclosure in any way. Those of ordinary skill in the art will recognize that equivalent embodiments may be created via slight alterations and modifications using the technical content disclosed above without departing from the scope of the technical solution of the present disclosure, and such summary alterations, equivalent has changed and modifications of the foregoing embodiments are to be viewed as being within the scope of the technical solution of the present disclosure.

What is claimed is:

1. A method for rendering statistics on web page visits by a browser, comprising:

adding a count to a first cumulative number of visits to a first web page upon detecting that a browser of a mobile terminal has visited the first web page via a first visiting mode, wherein the first mode is via inputting anyone of: a web address, a webpage navigation, a webpage bookmark and a webpage history;

adding a count to a second cumulative number of visits to the first web page upon detecting that the browser has visited the first web page via a second visiting mode, wherein the second visiting mode is caused by redirecting to the first web page from other visiting web pages among different domain names by clicking on a respective link of a respective visiting web page which has been loaded, acquiring the first cumulative number of visits and the second cumulative number of visits for each web page which the browser has visited, and combining a first product formed by the first cumulative number of visits and a preset weight of the first visiting mode and a second product formed by the second cumulative number of visits and a preset weight of the second visiting mode in order to calculate a visit coefficient for each of the web page the browser has visited by summing the first product and the second product;

determining a most frequent visited web page among all the web pages visited by the browser based on a preset individual web page having the highest calculated visit coefficient; and providing improved web page launching operations on the browser of the mobile terminal to the most frequently visited web page in accordance with statistics derived from the highest calculated visit coefficient.

2. The method according to claim 1, wherein the first visiting mode comprises any one of the following:

an address bar input, a browser navigation bar, a browser bookmark, or a browser history log.

3. The method according to claim 1, wherein the preset weight of the first visiting mode is larger than the preset weight of the second visiting mode.

4. An apparatus for rendering statistics on web page visits by a browser, comprises at least a processor operating in conjunction with at least a memory which stores instruction codes operable as plurality of units, wherein the instruction codes when executed by the processor, configure the apparatus to comprise:

add a count to a first cumulative number of visits to a first web page upon detecting that a browser of the apparatus has visited the first web page via a first visiting mode, wherein the first mode is via inputting anyone of:

a web address, a webpage navigation, a webpage bookmark and a webpage history;

add a count to a second cumulative number of visits to the first web page upon detecting that the browser has visited the first web page via a second visiting mode, wherein the second visiting mode is caused by redirecting to the first web page from other visiting web pages among different domain names by clicking on a respective link of a respective visiting web page which has been loaded, acquire the first cumulative number of visits and the second cumulative number of visits for each web page which the browser has visited, and combining a first product formed by the first cumulative number of visits and a preset weight of the first visiting mode and a second product formed by the second cumulative number of visits and a preset weight of the second visiting mode in order to calculate a visit coefficient for each of the web page the browser has visited by summing the first product and the second product;

determine a most frequent visited web page among all the web pages visited by the browser based on a preset individual web page having the highest calculated visit coefficient; and provide improved web page launching operations on the browser of the apparatus to the most frequently visited web page in accordance with statistics derived from the highest calculated visit coefficient.

5. The apparatus according to claim 4, wherein the first visiting mode comprises any one of the following:
an address bar input, a browser navigation bar, a browser bookmark, or a browser history log.

6. The apparatus according to claim 4, wherein the preset weight of the first visiting mode is larger than the preset weight of the second visiting mode.

7. A non-transitory computer-readable medium having stored thereon, a computer program having at least one code section being executable by a mobile terminal which causes the mobile terminal to perform steps for rendering statistics on web page visits by a browser, comprising:

adding a count to a first cumulative number of visits to a first web page upon detecting that a browser of a mobile terminal has visited the first web page via a first visiting mode, wherein the first mode is via inputting anyone of: a web address, a webpage navigation, a webpage bookmark and a webpage history;

adding a count to a second cumulative number of visits to the first web page upon detecting that the browser has visited the first web page via a second visiting mode, wherein the second visiting mode is caused by redirecting to the first web page from other visiting web pages among different domain names by clicking on a respective link of a respective visiting web page which has been loaded, acquiring the first cumulative number of visits and the second cumulative number of visits for each web page which the browser has visited, and combining a first product formed by the first cumulative number of visits and a preset weight of the first visiting mode and a second product formed by the second cumulative number of visits and a preset weight of the second visiting mode in order to calculate a visit coefficient for each of the web page the browser has visited by summing the first product and the second product;

determining a most frequent visited web page among all the web pages visited by the browser based on a preset individual web page having the highest calculated visit coefficient; and providing improved web page launching operations on the browser of the mobile terminal to the most frequently visited web page in accordance with statistics derived from the highest calculated visit coefficient.

8. The non-transitory computer-readable medium according to claim 7, wherein the first visiting mode comprises any one of the following:
an address bar input, a browser navigation bar, a browser bookmark, or a browser history log.

9. The non-transitory computer-readable medium according to claim 7, wherein the preset weight of the first visiting mode is larger than the preset weight of the second visiting mode.

* * * * *